(12) United States Patent
Ogawa et al.

(10) Patent No.: US 7,762,518 B2
(45) Date of Patent: Jul. 27, 2010

(54) SUPPORT STRUCTURE FOR LIQUID CRYSTAL TELEVISION RECEIVER AND SUPPORT STRUCTURE FOR DISPLAY DEVICE

(75) Inventors: Masuo Ogawa, Osaka (JP); Katsuhiko Makino, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 525 days.

(21) Appl. No.: 11/300,606

(22) Filed: Dec. 14, 2005

(65) Prior Publication Data

US 2006/0221262 A1 Oct. 5, 2006

(30) Foreign Application Priority Data

Dec. 14, 2004 (JP) ............................ P2004-360931

(51) Int. Cl.
*A47G 29/00* (2006.01)
(52) U.S. Cl. .................... 248/688; 248/176.3; 248/455; 248/917
(58) Field of Classification Search .............. 248/176.3, 248/653, 676, 688, 455, 456, 371, 917; 601/2; 40/120, 750, 753–755, 757, 765, 611, 649, 40/654.01, 775, 791; 361/679.22; 348/794, 348/836
See application file for complete search history.

(56) References Cited

U.S. PATENT DOCUMENTS 3,155,362 A * 11/1964 McCall ...................... 248/688
4,940,204 A * 7/1990 Nelson et al. ............... 248/688
5,823,504 A * 10/1998 Kuwajima ................... 248/688
6,216,377 B1 * 4/2001 Painsith ........................ 40/750
6,971,622 B2 * 12/2005 Ziegler et al. ............... 248/454
7,159,771 B2 * 1/2007 Singgih et al. .............. 235/383
2005/0040311 A1 * 2/2005 Lee ............................. 248/454

FOREIGN PATENT DOCUMENTS

| JP | 5-46182 | 6/1993 |
| JP | 3077169 | 2/2001 |
| JP | 2002-106542 | 4/2002 |
| JP | 2004-132410 | 4/2004 |

OTHER PUBLICATIONS

Patent Abstracts of Japan, Publication No. 2002-106542, Publication Date Apr. 10, 2002, 1 page.
Patent Abstracts of Japan, Publication No. 2004-132410, Publication Date Apr. 30, 2004, 1 page.

* cited by examiner

*Primary Examiner*—Korie Chan
(74) *Attorney, Agent, or Firm*—Osha • Liang LLP (57) ABSTRACT

A support structure for supporting a display device includes a base member mounted on a rear surface of the display device, a support member rotatably mounted on the base member that supports the display device in a state in which a lower surface of the display device is in contact with a setting plane and the support member is opened by a predetermined angle with respect to the base member, and a protruded portion formed integrally with an outer surface of the support member and extending in a widthwise direction of the support member, the protruded portion restricting rotation of the support member beyond a supporting position thereof by contact of the protruded portion with the base member when the display device is tilted.

6 Claims, 7 Drawing Sheets

SUPPORT STRUCTURE FOR LIQUID CRYSTAL TELEVISION RECEIVER AND SUPPORT STRUCTURE FOR DISPLAY DEVICE

BACKGROUND OF THE INVENTION

1. Field of the Invention

The present invention relates to a support structure for supporting a liquid crystal television receiver and a support structure for supporting a display device.

2. Description of the Related Art

Various display devices such as liquid crystal television receivers having support structures have been proposed (refer to, for example, Japanese Utility Model Registration No. 3077169, JP-UM-A-5-46182, JP-A-2002-106542 and JP-A-2004-132410).

An angle regulation device of a monitor is disclosed in Japanese Utility Model Registration No. 3077169. In rotating a body of the monitor in a vertical plane, the angle regulation device is capable of restricting the vertical rotation of the monitor body by making a contact protrusion mounted on a fixed seat mounted in a rear surface of the monitor body in contact with a cut-out portion of a pillar member supporting the monitor body and, in rotating the monitor body in a horizontal plane, the angler regulation device restricts horizontal rotation by making a contact protrusion mounted on an axis seat in a base in contact with a cut-out portion of a positioning ring provided in the pillar member.

Further, a structure of a liquid crystal television is disclosed in JP-UM-A-5-46182. In the disclosed structure, a display portion of the liquid crystal television receiver is supported horizontally or vertically by making a shaft for rotatably supporting the display portion hard to rotate by pinching the shaft between leaf springs of a brake detent mechanism and a moderation constraint mechanism and a downward rotation of the display portion of the liquid crystal television receiver can be restricted by making a stopper surface provided on the display portion in contact with a protruded portion of a cam member mounted on the shaft.

In JP-A-2002-106542, a structure of a display monitor, which is capable of changing rotation angle according to a using state thereof, in a usual use state and in a maintenance state, is disclosed. In the disclosed structure, when the monitor body is rotated vertically in the usual use state, the rotation is restricted by making a protruded portion provided on a member on the monitor body in contact with a stopper contact portion of a detachable cover and, when the monitor body is in the maintenance state by removing the cover, the rotation is restricted by making the protruded portion in contact with a groove provided in a member on a support.

In a support type thin television receiver, in which a body portion of the television receiver is rotated horizontally or vertically by rotating a connecting body provided between the body portion and a support around an axis of the support, JP-A-2004-132410 discloses a structure of a rotation mechanism of the thin television receiver, which is capable of producing a predetermined rotation load in rotating the body portion with respect to the support by mounting differently magnetized magnets on the connecting body and the support and arranging a magnetic force regulating spacer between the magnets.

Since, in the angle regulator of the monitor (display device) disclosed in Japanese Utility Model Registration No. 3077169, the monitor body is not supported by the setting plane, there is a problem that, when a downward force equal to or larger than a constant force is exerted on the monitor body after the monitor body is rotated downward by the contact of the contact protrusion in the fixed seat with a cut-out portion of the pillar member, the cut-out portion of the pillar member supporting the monitor body may be broken.

In the liquid crystal television receiver (display device) disclosed in JP-UM-A-5-46182, there is a problem that, since the display portion is not supported by the setting plane, the cum member is broken when a downward force equal to or larger than a constant force is exerted on the display portion after the display portion is rotated downward by the contact of the stopper surface with the protruded portion of the cum member.

In the display monitor (display device) disclosed in JP-A-2002-106542, there is a problem that, since the monitor body is not supported by the setting plane, the stopper contact portion of the cover is broken when a downward force equal to or larger than a constant force is exerted on the monitor body after the monitor body is rotated downward by the contact of the protruded portion formed on the member of the monitor body with the stopper contact portion.

In the support type thin television receiver (display device) disclosed in JP-A-2004-132410, there is a problem that, since there is no mechanism for restricting vertical rotation of the body portion, it is impossible to restrict rotation of the body portion when a downward force equal to or larger than a constant force is exerted on the body portion.

SUMMARY OF THE INVENTION

The present invention provides a support structure for a liquid crystal television receiver and a support structure for a display device, which are capable of restricting rotation of support members beyond a supporting position when a downward force equal to or larger than a constant force is exerted.

According to a first aspect of the present invention, a support structure for supporting a liquid crystal television receiver includes a base member mounted on a rear surface of the liquid crystal television receiver, a metal holding member mounted on the base member, and a support member rotatably mounted on the base member. The support member supports the liquid crystal television receiver in a state in which a lower surface of the liquid crystal television is in contact with a setting plane and the support member is opened at a predetermined angle with respect to the base member. A protruded portion extending in a widthwise direction of the support member is formed integrally with an outer surface of the support member, the protruded portion restricting rotation of the support member beyond a supporting position thereof by contact of the protruded portion in contact with the base member in a state where the liquid crystal television receiver is tilted. The base member includes a contact portion, which contacts with the protruded portion in the state where the liquid crystal television receiver is tilted. The contact portion of the base member extends in a widthwise direction of the base member to a vicinity of the outer surface of the support member in a state where the support member is closed with respect to the base member. A regulation portion that regulates rotation of the support member beyond the supporting position thereof is provided in the holding member. Rotation of the support member beyond the supporting position is regulated by the regulation portion and the protruded portion.

In the support structure of the liquid crystal television receiver according to the first aspect of the present invention, the liquid crystal television receiver is supported, in the state tilted with respect to the base member by a predetermined angle, by the lower surface thereof in contact with the setting plane and the opened support member. The protruded portion provided on the outer surface of the support member restricts rotation of the support member beyond the supporting position when it contacts with the base member with the liquid crystal television receiver in the tilted state. Therefore, when a downward force larger than a constant force is exerted on the liquid crystal television receiver in this state, the exerted force is dispersed to the lower surface of the television and the support member, so that the force exerted on support member is reduced and rotation of the support member beyond the supporting position is restricted by the protruded portion in contact with the base member. Thus, even when a downward force larger than a constant force is exerted on the liquid crystal television receiver, it is possible to prevent breakage of the support member and the base member, which rotatably supports the support member. Further, by providing the protruded portion on the support member integrally, there is no need of separately providing any member for restricting rotation of the support member. Therefore, an increase of the number of parts can be restricted. Further, the contact portion, which contacts with the protruded portion when the liquid crystal television receiver is tilted, is formed on the base member such that the contact portion extends up to the vicinity of the outer surface portion of the support member when the support member is closed with respect to the base member. Therefore, a distance between the support member and the base member becomes small, so that, in a case where the top end portion of the support member is damaged due to contact of the top end portion of the support member with the protruded portion, the damage on the top end portion can not be seen through the gap between the support member and the base member. Further, a finger is prevented from being caught between the support member and the base member due to smallness of the gap between the support member and the base member. Further, due to the contact portion, which contacts with the protruded portion and extends to the vicinity of the outer surface portion of the support member in the state where the support member is closed with respect to the base member, it is possible to make the protruded portion in contact with the contact portion even when height of the protruded portion is small. Further, by providing the protruded portion of the support member, which extends in the width direction of the support member, and providing the contact portion of the base member, which extends in the width direction of the base member, it is possible to increase a contact area in which the protruded portion of the support member is in contact with the contact portion of the base member to thereby easily restrict rotation of the support member beyond the supporting position even when a large downward force is exerted on the liquid crystal television receiver. Further, by providing the restriction portion for restricting rotation of the support member beyond the supporting position in the holding member and by restricting rotation of the support member beyond the supporting position by the restriction portion and the protruded portion, it is easily possible to restrict the rotation of the support member beyond the supporting position by the restriction portion of the holding member and the protruded portion of the support member even when a large downward force is exerted on the liquid crystal television receiver.

According to a second aspect of the present invention, a support structure for supporting a display device includes a base member mounted on a rear surface of the display device, a support member rotatably mounted on the base member that supports the display device in a state in which a lower surface of the display device is in contact with a setting plane and the support member is opened by a predetermined angle with respect to the base member, and a protruded portion formed integrally with an outer surface of the support member and extending in a widthwise direction of the support member, the protruded portion restricting rotation of the support member beyond a supporting position thereof by contact of the protruded portion with the base member when the display device is tilted.

As described above, in the support structure of the display device according to the second aspect of the present invention, the display device tilted with respect to the base member by a predetermined angle is supported by the lower surface thereof in contact with the setting plane and the opened support member. The protruded portion, which restricts rotation of the support member beyond the supporting position when it contacts with the base member of the tilted display device, is provided on the outer surface of the support member. Therefore, when, in this state, a downward force larger than the constant force is exerted on the display device, the exerted force is dispersed to the lower surface of the display device and the support member, which is in contact with the setting plane. Thus, the force exerted on support member is reduced and rotation of the support member beyond the supporting position is restricted by the protruded portion, which is in contact with the base member. Therefore, even when a downward force larger than the constant force is exerted on the display device, it is possible to prevent breakage of the support member and the base member rotatably supporting the support member. Further, due to the protruded portion formed on the support member integrally, there is no need of separately providing any member for restricting rotation of the support member. Therefore, an increase of the number of parts can be restricted.

In the support structure of the display device according to the second aspect of the present invention, the base member preferably includes the contact portion, which contacts with the protruded portion when the display device is tilted. The contact portion of the base member is formed such that it extends up to the vicinity of the outer surface portion of the support member in the state where the support member is closed with respect to the base member. With this construction, a distance between the support member and the base member becomes small. Therefore, when the top end portion of the support member is damaged due to contact of the top end portion of the support member with the member arranged within the base member, the damage on the top end portion can not be seen through the gap between the support member and the base member. Further, is due to the small gap between the support member and the base member, a finger is prevented from being caught between the support member and the base member. Further, by providing the contact portion, which contacts with the protruded portion, such that it extends to the vicinity of the outer surface portion of the support member in the state where the support member is closed with respect to the base member, it is possible to make the protruded portion in contact with the contact portion even when height of the protruded portion is small.

In the support structure of the display device, which includes the base member having the contact portion, it is preferably that the protruded portion on the outer surface of the support member is provided such that it extends in the widthwise direction of the support member and the contact portion of the base member is provided such that it extends in the widthwise direction of the base member. With such construction, it is possible to increase a contact area of the protruded portion of the support member and the contact portion of the base member, to thereby easily restrict rotation of the support member beyond the supporting position even when a large downward force is exerted on the liquid crystal television receiver.

In the support structure of the display device according to the second aspect of the present invention, it is preferable that it further includes a metal holding member mounted on the base member and a restriction portion for restricting rotation of the support member beyond the supporting position is provided in the holding member. Rotation of the support member beyond the setting position thereof is restricted by the restriction portion of the holding member and the protruded portion of the support member. With such construction, it is possible to restrict rotation of the support member beyond the setting position by the holding member and the restriction member even when a large downward force is exerted on the display device.

DETAILED DESCRIPTION OF THE INVENTION

Embodiments of the present invention will be described with reference to the drawings.

Figure 1:
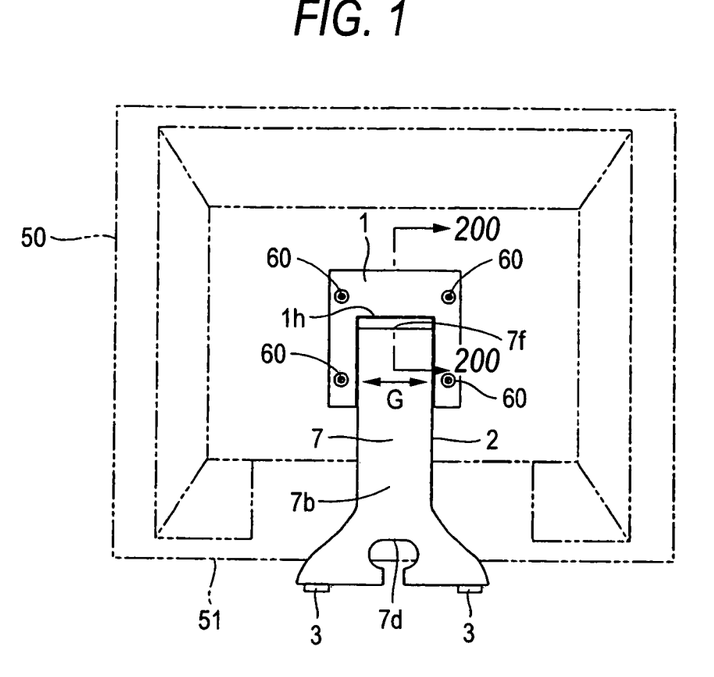
FIG. 1 is a front view of a support structure of a liquid crystal television receiver according to an embodiment of the present invention, showing a state where the support structure is mounted on a rear surface of the liquid crystal television receiver.

FIG. 1 is a front view of a support structure of a liquid crystal television receiver according to an embodiment of the present invention, in which it is mounted on a rear surface of the liquid crystal television receiver. FIGS. 2 to 9 are drawings for showing a detailed structure of the support structure of the liquid crystal television receiver shown in FIG. 1. Incidentally, in this embodiment, a case where the support structure of a display device of the present invention is applied to a support structure of a liquid crystal television receiver will be described.

Figure 2:
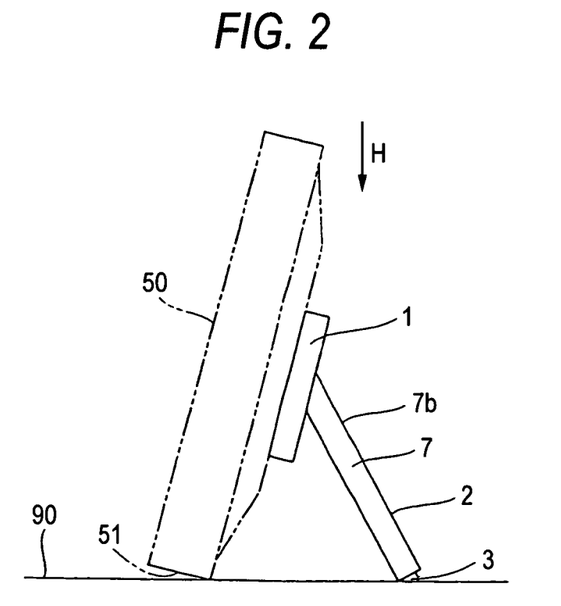
FIG. 2 is a side view of the support structure of the liquid crystal television receiver according to the embodiment of the present invention shown in FIG. 1, showing the state where the support structure is mounted on the rear surface of the liquid crystal television receiver.
Figure 3:
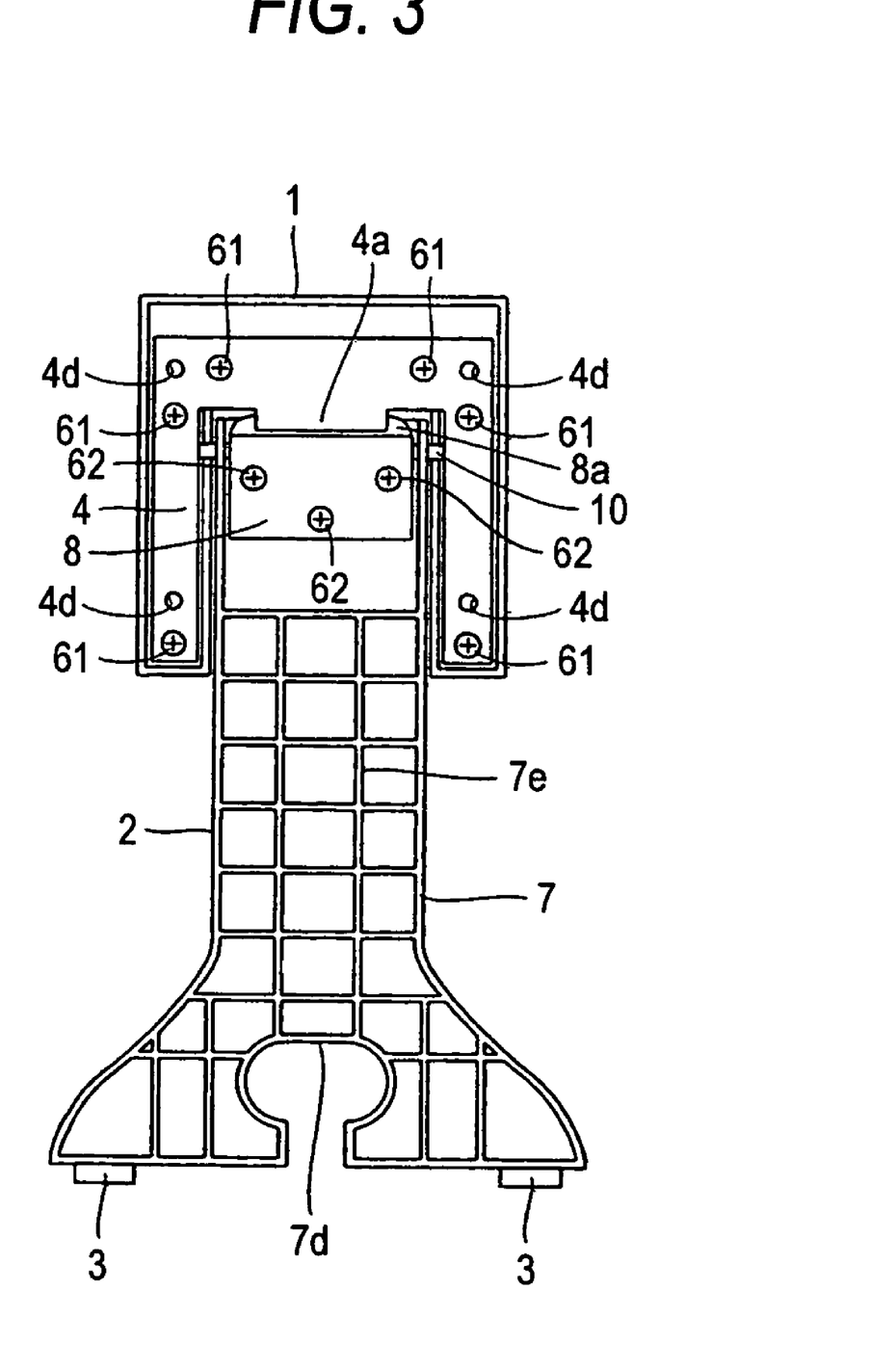
FIG. 3 is a rear view of the support structure of the liquid crystal television receiver according to the embodiment of the present invention shown in FIG. 1.

As shown in FIGS. 1 to 3, the support structure of the liquid crystal television receiver includes a base member 1 made of a synthetic material and mounted on a rear surface of a television receiver 50 (see FIGS. 1 and 2) by screws 60 (see FIG. 1), a support member 2 rotatably mounted on the base member 1 and contact pads 3 made of rubber and mounted on a bottom portion of the support member 2.

In this embodiment, the support member 2 supports the liquid crystal television receiver 50 in a state where a lower surface 51 of the liquid crystal television receiver 50 is in contact with a horizontal setting plane 90 and the support member 2 is opened with respect to the base member 1 by a predetermined angle, as shown in FIG. 2.

Figure 4:
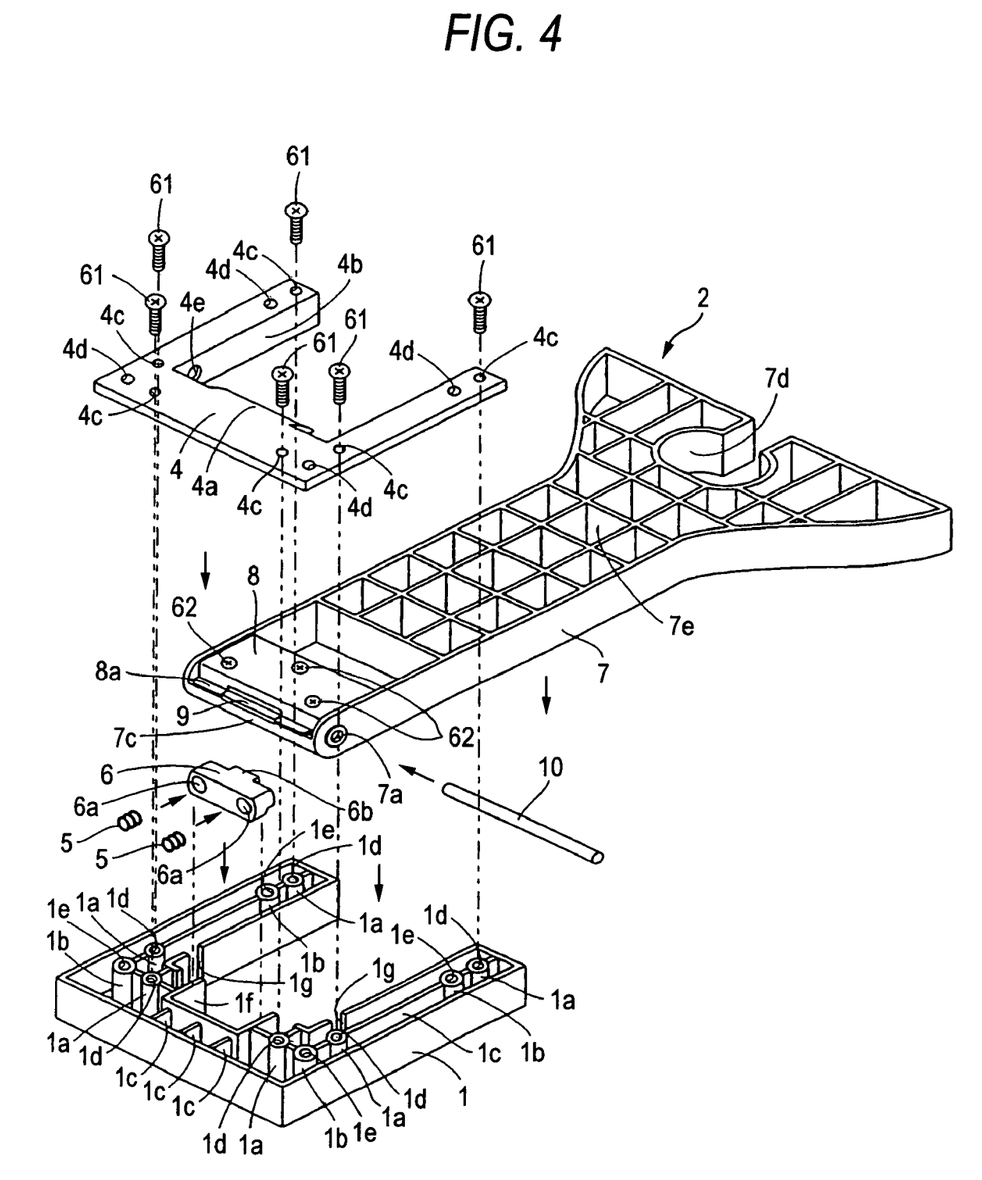
FIG. 4 is a disassembled perspective view of the support structure of the liquid crystal television receiver according to the embodiment of this invention shown in FIG. 1.

Further, as shown in FIG. 4, the base member 1 has six (6) boss portions 1a, four (4) boss portions 1b and reinforcing ribs 1c. The boss portions 1a are formed with screw holes id, respectively. Further, the boss portions 1b are formed with screw holes 1e into which screws 60 (see FIG. 1) are inserted, respectively. A contact portion 1h is provided in the base member 1 on the side of the support member 2, as shown in FIG. 1.

In this embodiment, the contact portion 1h is formed such that it extends to the vicinity of an outer surface portion 7b of a main support 7 to be described later, in a state where the support member 2 is closed with respect to the base member 1. Thus, it is possible to prevent a finger of a user from being caught in a gap 70 (see FIG. 9) between the support member 2 and the base member 1. Further, the contact portion 1h is formed such that it extends in a width direction (direction G in FIG. 1) of the base member 1.

Figure 7:
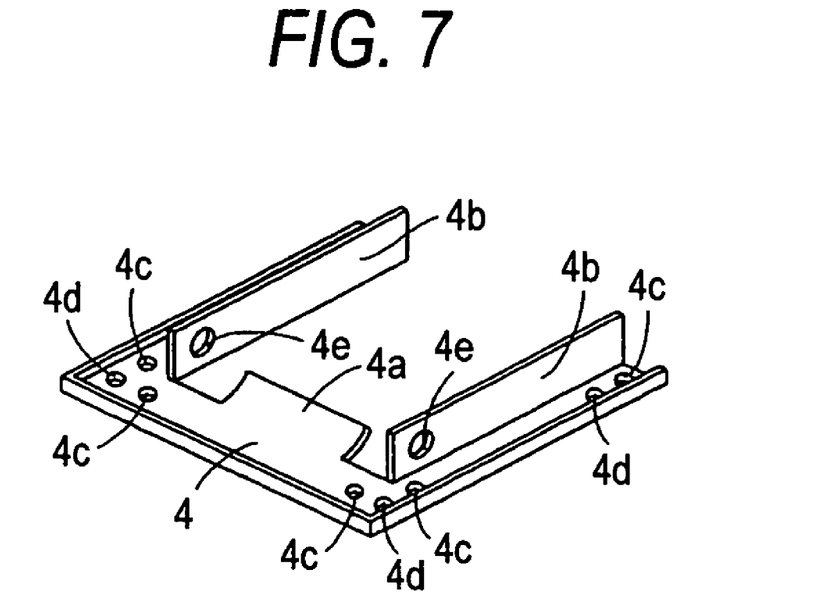
FIG. 7 is a perspective view showing a holding member of the support structure of the liquid crystal television receiver according to the embodiment of this invention shown in FIG. 1.

Further, as shown in FIG. 3, a holding member 4 made of a metal material is mounted on the base member 1 by tightly screwing six (6) screws 61 into the screw holes 1d formed in the boss portions 1a of the base member 1. As shown in FIGS. 4 and 7, the holding member 4 is formed with a restricting portion 4a for preventing the support member 2 from rotating over a supporting position and a pair of side walls 4b, which are bent toward the base member 1. The holding member 4 is formed with screw holes 4c corresponding, in position, to the screw holes 1d formed in the respective boss portions 1a of the base member 1 and screw holes 4d corresponding in position to the screw holes 1e formed in the boss portions 1b of the base member 1. The support structure is mounted on the rear surface of the liquid crystal television receiver 50 by tightening the screws 60 through the screw holes 1e and the screw holes 4d formed in the boss portions 1b of the base member 1. Mounting holes 4e, through which a pin 10 is inserted, are provided in the respective side walls 4b.

Figure 8:
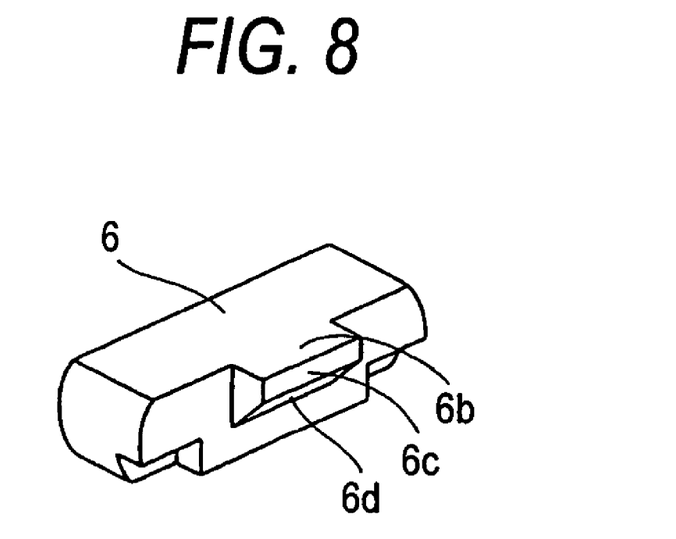
FIG. 8 a perspective view showing a slider of the support structure of the liquid crystal television receiver according to the embodiment of this invention shown in FIG. 1.

As shown in FIG. 4, a slider 6 having a pair of compressed coil springs 5 fitted therein is provided. The compressed coil springs 5 are fitted in respective spring fitting holes 6a provided in the slider 6. Further, as shown in FIG. 8, a protrusion 6b is provided on a portion of the slider 6 on the side of the support member 2. The protrusion 6b includes a flat surface portion 6c and a slanted surface portion 6d.

Figure 5:
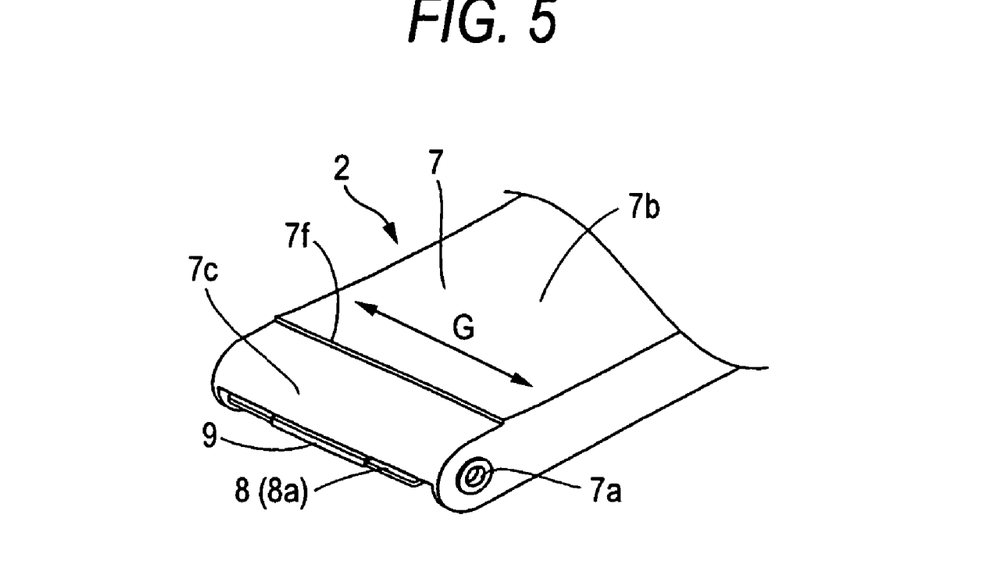
FIG. 5 is a perspective view showing a support member of the support structure of the liquid crystal television receiver according to the embodiment of this invention shown in FIG. 1.
Figure 6:
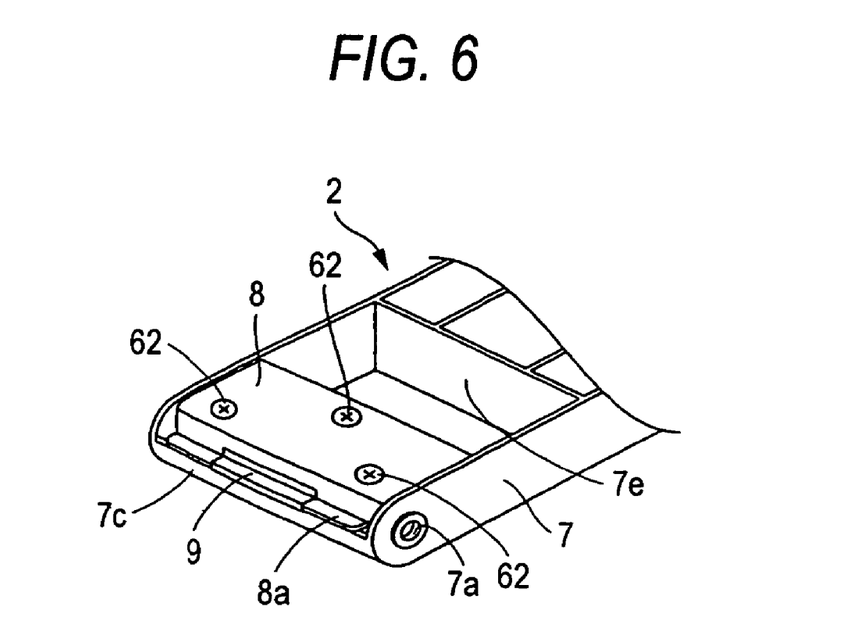
FIG. 6 is a perspective view showing a rear portion of a support member of the support structure of the liquid crystal television receiver according to the embodiment of this invention shown in FIG. 1.

Further, as shown in FIGS. 4 to 6, the support member 2 includes a main support portion 7 made of resin, a metal cover member 8 mounted on the main support portion 7 by screws 62 and a metal reinforcing piece 9 mounted on a protruded portion 8a of the cover member 8. The support member 2 is rotatable around the pin 10 inserted into holes 7a formed in the main support member 7 and the holes 4e of the holding member 4 (see FIG. 7) and supported by a pin supporting portion 1g of the base member 1 (see FIGS. 3 and 4). The main support portion 7 further includes an outer surface portion 7b, a top end portion 7c having a curved surface on the side of the base member 1, an electric cord insertion portion 7d for passing an electric cord and a reinforcing rib 7e for reinforcing a cavity formed inside of the main support portion 7. Incidentally, the outer surface portion 7b is an example of an "outer surface" of the present invention.

In this embodiment, a protruded portion 7f is integrally formed on the outer surface portion 7b of the main support portion 7 as shown in FIGS. 1 and 5. The protruded portion 7f becomes in contact with the contact portion 1h of the base member 1 to restrict rotation of the support member 2 beyond the supporting position in the state where the liquid crystal television receiver 50 is tilted. Therefore, rotation of the support member 2 beyond the supporting position is restricted is by the restriction portion 4a provided on the holding member 4 and the protruded portion 7f. Further, the protruded portion 7f is curved up from the outer surface portion 7b of the main support portion 7 to a height of about 0.4 mm and fully extends in a width direction (direction G in FIGS. 1 and 5) of the outer surface portion 7b of the main support portion 7.

The protruded portion 8a of the cover member 8 and the reinforcing piece 9 mounted on the protruded portion 8a of the cover member 8 protrude toward the slider 6 beyond the top end portion 7c of the main support portion 7.

Figure 9:
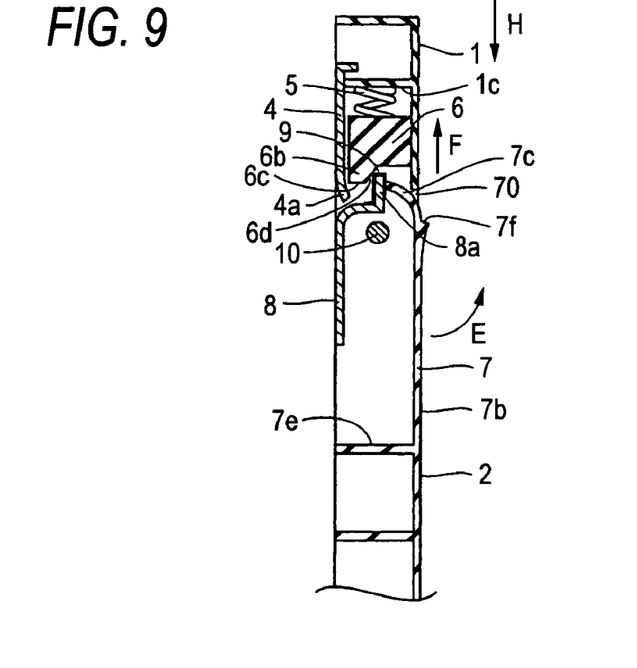
FIG. 9 is a cross-sectional view taken along a line 200-200 in FIG. 1.
Figure 10:
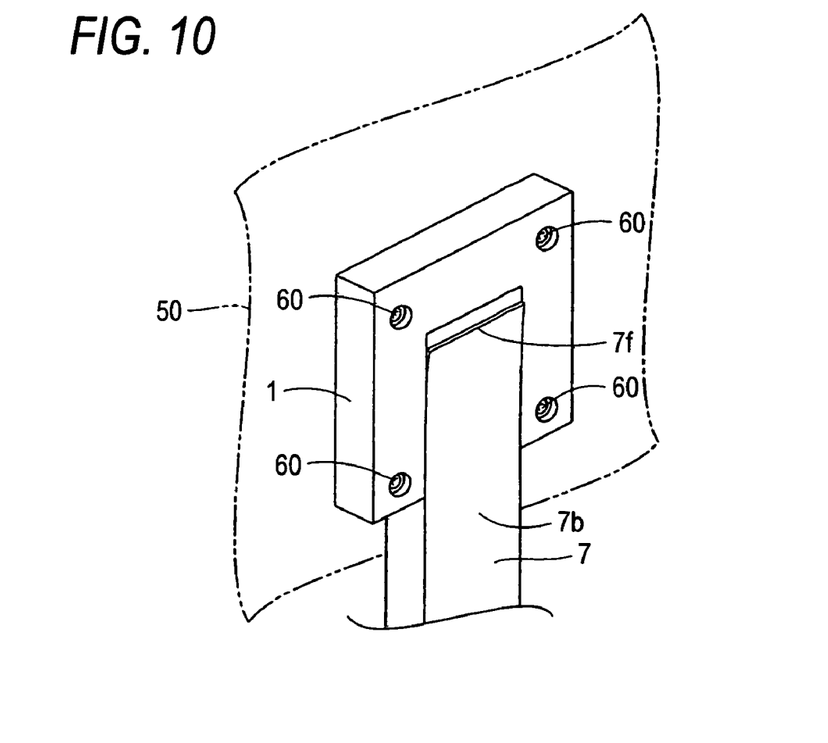
FIG. 10 is a perspective view of the support structure of the liquid crystal television receiver according to the embodiment of the present invention, for explaining an open and close movement of the support structure.
Figure 11:
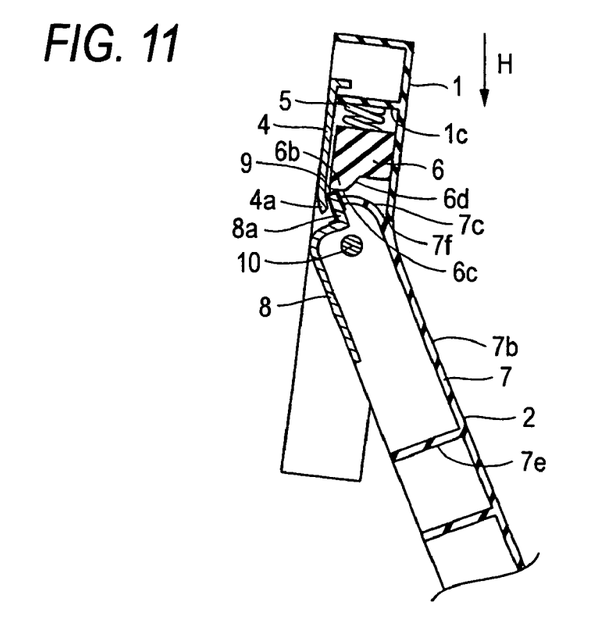
FIG. 11 is a cross sectional view of the support structure of the liquid crystal television receiver according to the embodiment of the present invention, for explaining an open and close movement of the support structure.
Figure 12:
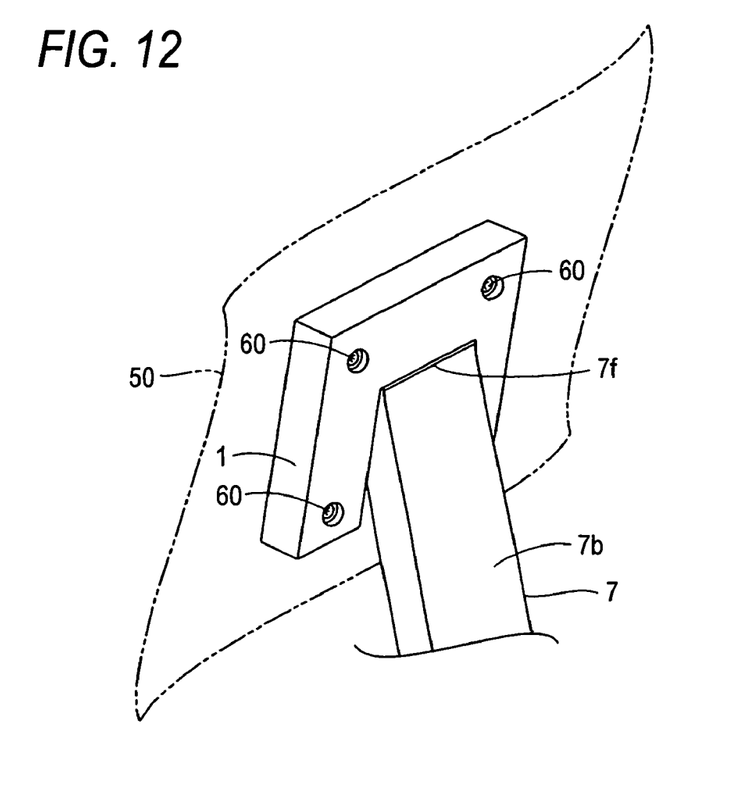
FIG. 12 is a perspective view of the support structure of the liquid crystal television receiver according to the embodiment of the present invention, for explaining an open and close movement of the support structure.

FIGS. 10 to 12 show an open/close movement of the support structure of the liquid crystal television receiver. The open/close movement of the support structure of the liquid crystal television receiver will be described with reference to FIGS. 9 to 12. First, in a state where the support of the liquid crystal television receiver is closed as shown in FIGS. 9 and 10, the support member 2 is rotated in an arrow direction E shown in FIG. 9. In this case, the reinforcing piece 9 mounted on the protruded portion 8a of the cover member 8 becomes in contact with the slanted surface portion 6d of the slider 6, so that the slider 6 is urged in an arrow direction F shown in FIG. 9 against compression force of the compressed coil spring 5 exerted on the slanted surface portion 6d. By further rotating the support member 2 from this state, the reinforcing piece 9 mounted on the protruded portion 8a of the cover member 8 presses the flat surface portion 6c over the slanted surface portion 6d of the slider 6. Then, the reinforcing piece 9 mounted on the protruded portion 8a of the cover member 8 becomes in contact with the restriction portion 4a of the holding member 4 mounted on the base member 1 and the support member 2 is rotated until the protruded portion 7f of the main support 7 becomes in contact with the contact portion 1h of the base member 1, as shown in FIGS. 11 and 12. Thus, the liquid crystal television receiver 50 can be supported in the supporting position.

In this embodiment, the liquid crystal television receiver 50 is supported by the support structure by rotating the support member 2 by the predetermined angle with respect to the base member 1 in the state where the lower surface 51 of the liquid crystal television receiver 50 is in contact with the setting plane 90. When, in this state, a downward (arrow direction H in FIG. 2) force equal to or larger than a constant force is exerted on the liquid crystal television receiver 50 in the tilted, the exerted force is dispersed to the lower surface 51 of the television 50 and the contact members 3 mounted on a lower end of the support member 2 by the protruded portion 7f on the outer surface portion 7b of the main support 7, which is to restrict rotation of the support member 2 beyond the supporting position by contacting with the contact portion 1h of the base member 1. Thus, it is possible to reduce the force exerted on the support member 2 and to prevent the support member 2 from rotating beyond the supporting position by the protruded portion 7f in contact with the contact portion 1h of the base member 1. Thus, it is possible to prevent breakage of the support member 2 and the base member 1 rotatably supporting the support member 2 even when a downward (arrow direction H in FIG. 2) force larger than a constant force is applied to the liquid crystal television receiver 50 in the state where the latter is held in the slanted state.

In this embodiment, the protruded portion 7f is formed on the main support 7 integrally and, therefore, there is no need of separately providing any member for restricting rotation of the support member 2. Therefore, an increase of the number of parts can be restricted.

Further, in this embodiment, by the formation of the contact portion 1h, which contacts with the protruded portion 7f in the state where the liquid crystal television receiver 50 is tilted and extends up to the vicinity of the outer surface portion 7b of the main support 7 in the state where the support member 2 is closed with respect to the base member 1, the distance between the outer surface portion 7b of the main support 7 and the contact portion 1h of the base member 1 becomes small. Therefore, when the top end portion 7c of the main support 7 is damaged due to contact of the top end portion of the main support 7 with the protruded portion 6b of the slider 6 arranged inside of the base member 1, the damage on the top end portion 7c can not be seen through the gap 70 between the main support 7 and the base member 1.

Further, in this embodiment, the contact portion 1h, which contacts with the protruded portion 7f, is formed such that it extends to the vicinity of the outer surface portion 7b of the main support 7. Therefore, even when height of the protruded portion 7f is small (about 0.4 mm), it is possible to make the protruded portion 7f in contact with the contact portion 1h.

Further, in this embodiment, the protruded portion 7f of the main support 7 is formed such that it extends up to the vicinity of the outer surface portion 7b of the main support 7 in the width direction (direction G in FIGS. 1 and 5) and the contact portion 1h of the base member 1 extends in the width direction (direction G in FIGS. 1 and 5) of the base member 1. Therefore, it is possible to increase the contact area of the protruded portion 7f of the main support 7 with the contact portion 1h of the base member 1 to thereby restrict rotation of the support member 2 beyond the supporting position even when a large downward (arrow H direction in FIG. 2) force is exerted on the liquid crystal television receiver 50.

Further, in this embodiment, rotation of the support member 2 beyond the supporting position is restricted by the restriction portion 4a provided on the holding member 4 and the protruded portion 7f and, therefore, it is possible to restrict the rotation of the support member 2 beyond the supporting position by the restriction portion 4a of the holding member 4 and the protruded portion 7f of the main support 7 even when a large downward (arrow H direction in FIG. 2) force is exerted on the liquid crystal television receiver 50.

Incidentally, it should be understood that the described embodiment is a mere example in all sense and is not restrictive and the scope of this invention is defined by not the described embodiment but the appended claims and all modifications in the meaning of equivalent to and within the claims are included in the present invention.

In the described embodiment, this invention is applied to the support structure for the liquid crystal television receiver as an example. However, this invention can be applied to other display devices having support structures than the liquid crystal television receiver. For example, the present invention can be applied to a plasma display and the like.

Further, although the rotation of the support member beyond the supporting position is prevented by the combination of the restriction portion and the protruded portion in the described embodiment, it is possible to restrict the rotation by only the protruded portion.

Although, in the described embodiment, the contact portion, which contacts with the protruded portion, extends up to the vicinity of the outer surface of the main support, it is possible in this invention that the distance between the outer surface of the main support and the contact portion of the base member may be not small. Incidentally, in such case, in order to contact the protruded portion with the contact portion in rotating the support member, it is necessary to make the height of the protruded portion larger.

What is claimed is:

1. A support structure, comprising:
   a display device;
   a base member mounted on a rear surface of the display device;
   a support member rotatably mounted on the base member and supporting the display device;
   an urging member provided on the base and configured to apply a force against rotation of the support member;
   a protruded portion provided on a first part of the support member; and
   a holding member provided on a first part of the base member,
   wherein, when the support member is rotated in a first direction to a predetermined position angled from the base member, the protruded portion comes in contact with a second part of the base member in the first direction so that the support member is prevented from rotating in the first direction,
   wherein, when the support member is rotated in the first direction to the predetermined position, a second part of the support member comes in contact with the holding member in the first direction so that the support member is prevented from rotating in the first direction, and
   wherein lower ends of the display device and the support member are adapted to be placed on a setting plane when the support member is placed in the predetermined position.

2. The support structure as claimed in claim 1, wherein the protruded portion extends in a direction parallel to a rotation axis of the support member.

3. The supporting structure as claimed in claim 1, wherein the display device is a liquid crystal television receiver.

4. A support structure adapted to support a display device on a setting plane, comprising:
   a base member adaptably mounted on a rear surface of the display device;
   a support member rotatably mounted on the base member, and supporting the display device;
   an urging member provided on the base and configured to apply a force against rotation of the support member;
   a protruded portion provided on a first part of the support member; and
   a holding member provided on a first part of the base member,
   wherein, when the support member is rotated in a first direction to a predetermined position angled from the base member, the protruded portion comes in contact with a second part of the base member in the first direction so that the support member is prevented from rotating in the first direction,
   wherein, when the support member is rotated in the first direction to the predetermined position, a second part of the support member comes in contact with the holding member in the first direction so that the support member is prevented from rotating in the first direction, and
   wherein lower ends of the display device and the support member are adapted to be placed on a setting plane when the support member is placed in the predetermined position.

5. The support structure as claimed in claim 4, wherein the protruded portion extends in a direction parallel to a rotation axis of the support member.

6. The supporting structure as claimed in claim 4, wherein the display device is a liquid crystal television receiver.

* * * * *